United States Patent [19]

Orton

[11] Patent Number: 4,914,368

[45] Date of Patent: Apr. 3, 1990

[54] RC SERVO

[76] Inventor: Kevin R. Orton, c/o Tekin Electronics, 1027 Trepadora, San Clemente, Calif. 92672

[21] Appl. No.: 251,569

[22] Filed: Sep. 30, 1988

[51] Int. Cl.⁴ .............................................. G05B 5/01
[52] U.S. Cl. .................................. 318/663; 318/615; 318/466
[58] Field of Search ............................ 318/610–673, 318/678, 684; 338/102, 103, 104, 105, 106, 107, 116

[56] References Cited

U.S. PATENT DOCUMENTS

| | | | |
|---|---|---|---|
| 2,519,118 | 8/1950 | Curtis et al. | 318/12 X |
| 2,894,236 | 7/1959 | Jopson | 338/116 |
| 2,906,983 | 9/1959 | Jenney | 338/116 |
| 2,913,694 | 11/1959 | Heselwood | 338/116 X |
| 2,915,247 | 12/1959 | Tolson | 318/618 |
| 2,929,974 | 3/1960 | Wells | 318/13 X |
| 2,951,397 | 9/1960 | Schroeder | 318/13 X |
| 2,969,094 | 1/1961 | Johnson | 318/672 X |
| 3,114,126 | 12/1963 | McClay | 338/116 |
| 3,191,134 | 6/1965 | Stillwater | 318/613 X |
| 3,665,278 | 5/1972 | Kazmarek | 318/615 X |

Primary Examiner—William M. Shoop, Jr.
Assistant Examiner—Paul Ip
Attorney, Agent, or Firm—Loyal M. Hanson

[57] ABSTRACT

A servo for driving a control linkage in a radio controlled model includes a motor, a gear train coupled to the motor, an output shaft coupled to the gear train to which to couple a control linkage, a position sensor coupled to the output shaft for producing a signal indicative of output shaft position for feedback control purposes, and a slip clutch between the gear train and the output shaft for at least partially inhibiting the transmission of a transient force from the output shaft back to the gear train.

16 Claims, 2 Drawing Sheets

RC SERVO

BACKGROUND OF THE INVENTION

1. Technical Field

This invention relates generally to componentry for radio controlled models, and more particularly to an RC servo.

2. Background Information

Radio controlled or RC servos drive various control linkages on radio controlled models, such as the steering linkage on a model car or the control surface linkages on a model airplane or model boat. With a handheld transmitter, the user transmits a signal to a receiver mounted on the model and the receiver produces a control signal to which the RC servo responds to drive the control linkage accordingly.

The housing of a typical RC servo for a radio controlled car, for example, may be about 4×4×2 cm and contain a battery-powered motor for this purpose. A gear train within the housing couples the motor to an output shaft that extends through the housing where it can be coupled to the steering linkage by suitable components, including an output arm mounted on the output shaft. When the motor moves, the output arm moves to drive the steering linkage.

Feedback control circuitry within the housing operates conventionally to sense the position of the output shaft and drive the motor until the output shaft is in a desired position. A position sensor in the form of a potentiometer coupled to the output shaft may be used to sense the output shaft position for this purpose. Known electrical circuitry produces an error signal indicative of the difference between output shaft position and the desired position, and the error signal is used to produce a motor control signal that drives the motor until the output shaft has moved to the desired position.

This results in accurate control of the output shaft according to well known principles of feedback control. However, there are certain problems to be overcome. For example, the model car may run into a rut in the road or other obstacle that results in a large transient force being transmitted through the steering linkage to the RC servo. Similar transient forces may result in other radio controlled models as well, and these forces may damage the RC servo.

To overcome this problem, some control linkages, such as the steering linkage of some existing radio controlled model cars, include a spring-coupled section for smoothing transient forces so that they do not damage the RC servo. It may take the form of a spring-coupled output arm, for example. When a transient force is transmitted along the steering linkage to the spring-coupled output arm, the spring resiliently deforms to provide a filtering effect so that the transient force is not rigidly coupled to the RC servo. In most cases, this helps prevent damage to the RC servo.

However, utilizing a spring-coupled section of linkage introduces other problems that need to be overcome. First, it introduces sloppiness or play in the linkage such that the linkage does not always return to a center or zero point. As a result, the spring-coupled section may result in inaccurate positioning of a steering linkage or of control surface linkages.

In addition, a spring-coupled section may mean more parts, expense, weight, and space. Each of these should be kept to a minimum.

Furthermore, it may be intended that the spring-coupled section of linkage be suitable for use with various RC servos, instead of designing, manufacturing, and selling a different spring-coupled section for each of various available RC servos. Thus, the spring-coupled section must be designed to protect the most fragile of available RC servos so that it may over-protect the less fragile RC servos.

Moreover, if the transient force is large enough, the spring-coupled section may be driven to its limit. In other words, the force may fully extend or compress the spring so that the force is still rigidly transmitted to the RC servo despite the spring-coupled section.

Consequently, it is desirable to have a new and improved RC servo that overcomes these concerns.

SUMMARY OF THE INVENTION

This invention solves the problems outlined above with a RC servo that includes a slip clutch arrangement between the motor and the position sensor so that it is within the feedback loop. The slip clutch provides an override capability that decouples transient forces so that the output shaft can be rigidly coupled to the control linkage without the extra componentry that a spring-coupled section represents. Because the slip clutch is within the feedback loop, the feedback control circuitry compensates for any sloppiness or play that the slip clutch introduces, and there is no limit to the override capability.

Generally, a servo for driving a control linkage in a radio controlled model that is constructed according to the invention includes a motor, a gear train coupled to the motor, an output shaft coupled to the gear train to which to couple a control linkage, and position sensing means coupled to the output shaft for producing a signal indicative of output shaft position for feedback control purposes.

According to a major aspect of the invention, a slip clutch arrangement is provided between the gear train and the output shaft for at least partially inhibiting the transmission of a transient force from the output shaft back to the gear train. The gear train may include an output gear, for example, and the slip clutch arrangement may include means for coupling the output gear to the output shaft to enable the output shaft to slip relative to the output gear when the transient force reaches a predetermined level.

According to another aspect of the invention, the means for coupling the output gear to the output shaft includes the output gear having a transverse surface generally perpendicular to an axis of rotation of the output gear, the output gear defining a central opening that extends along the axis of rotation through the output gear, and the output shaft including a radially extending portion that faces the transverse surface of the output gear.

The output shaft extends along the axis of rotation through the central opening so that the output shaft can rotate about the axis of rotation relative to the output gear and so that the output shaft can be moved axially for purposes of forcing the radially extending portion against the transverse surface. The radially extending portion of the output shaft includes means for engaging the output gear when the radially extending portion is forced against the transverse surface of the output gear.

Components may be provided for forcing the radially extending portion of the output shaft against the transverse surface of the output gear with a fixed amount of force so that the output shaft slips relative to the output gear when the transient force reaches the predetermined level. A spring member may be operationally connected between the output shaft and the output gear for this purpose.

According to yet another aspect of the invention, the means for coupling the output gear to the output shaft is arranged differently. The output gear defines a central opening that extends through the output gear along an axis of rotation of the output gear, the output gear has an inwardly facing portion facing the central opening, and the output shaft extends along the axis of rotation through the central opening so that the output shaft can rotate about the axis of rotation relative to the output gear. Means are provided for coupling the output shaft to the inwardly facing portion of the output gear in order to couple the output gear to the output shaft and yet enable the output shaft to slip relative to the output gear when the transient force reaches the predetermined level.

In one embodiment, the output shaft includes a radially extending portion disposed within the central opening, the radially extending portion has a periphery that faces the inwardly facing portion of the output gear, and coupling is accomplished by coupling the periphery of the radially extending portion of the output shaft to the inwardly facing portion of the output gear. Alternate ways of doing this are disclosed.

In line with the above, a method of at least partially inhibiting damage to an existing servo that is utilized to drive a control linkage in a radio controlled model caused by transient forces transmitted along the control linkage includes replacing the output gear of the existing servo with an output component having an output gear, an output shaft, and means for coupling the output gear to the output shaft to enable the output shaft to slip relative to the output gear when the transient force reaches a predetermined level.

The above mentioned and other objects and features of this invention and the manner of attaining them will become apparent, and the invention itself will be best understood, by reference to the following description taken in conjunction with the accompanying illustrative drawings.

DESCRIPTION OF THE PREFERRED EMBODIMENTS

Figure 1:
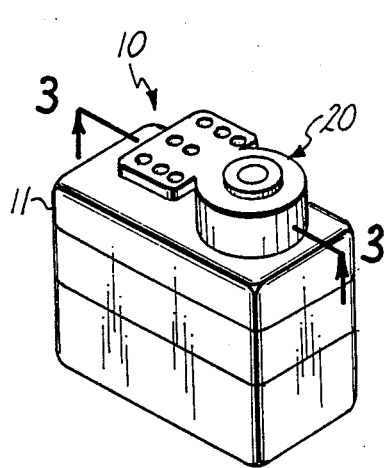
FIG. 1 of the drawings is a perspective view of a prior art servo.
Figure 2:
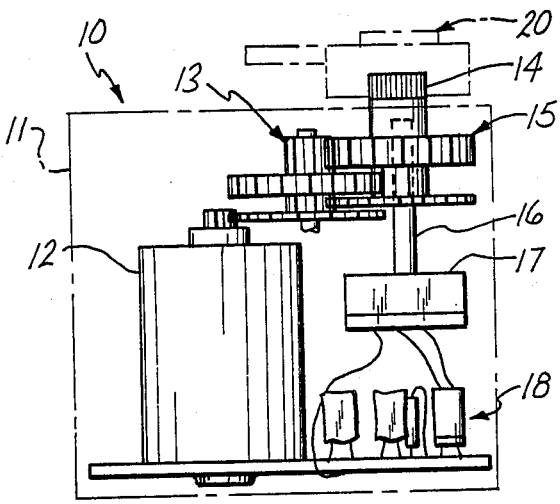
FIG. 2 an elevation view of the prior art servo showing internal components.
Figure 3:
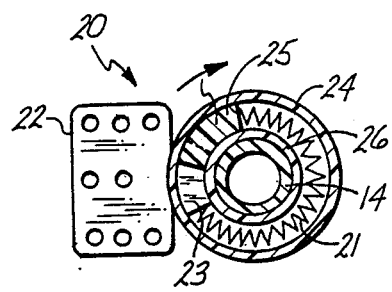
FIG. 3 is a cross sectional view of the prior art servo taken on line 3—3 of FIG. 1 showing details of the spring-coupled output arm.

Referring first to FIGS. 1-3, there is shown various aspects of a RC servo 10 constructed according to the prior art. It is similar to many commercially available RC servos, having a 4×4×2 cm housing 11 (FIGS. 1 and 2) that contains a small, battery-powered electric motor 12 (FIG. 2). The motor 12 is coupled by a gear train 13 to an output shaft 14 that extends out of the housing 11 and is otherwise arranged for connection to a control linkage in a radio controlled model, such as by including a splined portion over which to place an output arm. The gear train 13 includes an output gear 15 that is rigidly connected to the output shaft 14 along with a shaft 16 of a position sensor or potentiometer 17 (FIG. 2).

The potentiometer 17 combines with electronic feedback control circuitry 18 to serve as position sensing means coupled to the output shaft 14 for producing a signal indicative of output shaft position for feedback control purposes. The feedback control circuitry 18 operates conventionally to sense the position of the output shaft 14 and drive the motor 12 until the output shaft 14 is in a desired position as indicated by the potentiometer 17.

As previously mentioned, the above arrangement results in accurate control of the output shaft 14 according to well known principles of feedback control. However, transient forces coupled from the control linkage back to the output shaft 14 may cause damage. Consequently, the prior art RC servo 10 includes a spring-coupled section of the control linkage. Various arrangements are employed in the prior art, but the illustrated RC servo 10 includes a spring-coupled section in the form of a spring-coupled output arm 20 (FIGS. 1-3) for smoothing transient forces so that they do not damage the RC servo 10.

In use, other control linkage components (not shown) are connected to the output arm 20. When a transient force is transmitted along the other control linkage components to the spring-coupled output arm 20, a spring 21 within a two-piece case 22 of the output arm 20 (FIG. 3) resiliently deforms to provide a filtering effect. This is accomplished by a radially projecting tab 23 of a first component 24 of the two-piece casing 22 that rotates relative to a radially projecting tab 25 of a second component 26 to compress the spring 21 in the direction of the arrow in FIG. 3 so that the transient force is not rigidly coupled to the output shaft 14 of the RC servo 10. This inhibits damage, but it results in the drawbacks previously mentioned.

Figure 4:
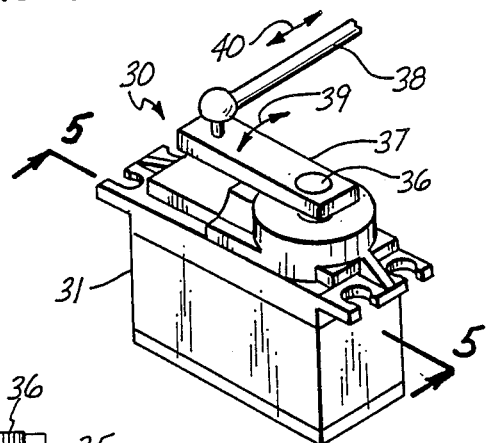
FIG. 4 is a perspective view of an RC servo constructed according to the invention.
Figure 5:
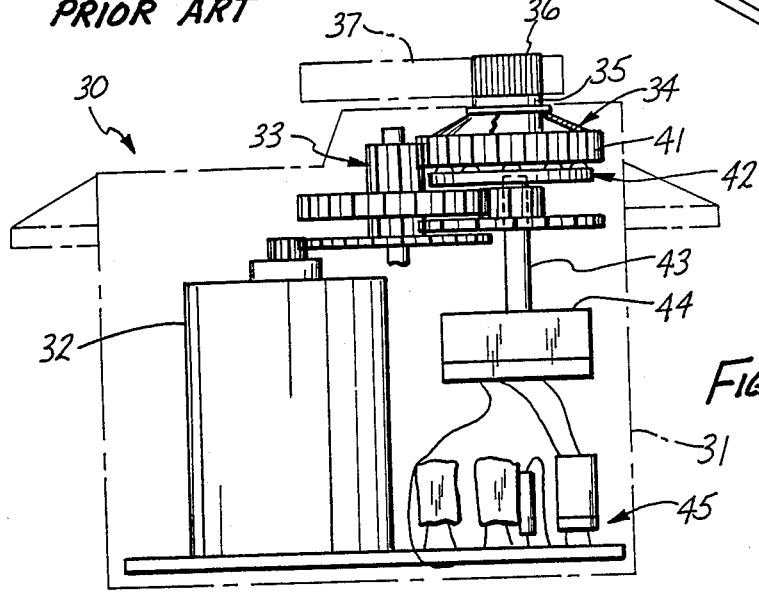
FIG. 5 is a cross sectional view of the RC servo taken on line 5—5 of FIG. 4.

Considering now FIGS. 4 and 5, there is shown an RC servo 30 constructed according to the invention that overcomes those drawbacks. Generally, the RC servo 30 includes a housing 31 (FIGS. 4 and 5) that contains an electric motor 32 (FIG. 5). These components are similar to the housing 11 and motor 12 of the prior art described above and the components employed in the device designated Servo 94631 available from Airtronics Inc. of Irvine, California.

The motor 32 is coupled by a gear train 33 to an output component 34 that includes an output shaft 35 having a splined portion 36 that extends out of the housing 31 and is otherwise arranged for connection to an output arm 37 and thereby to a control linkage 38 in a radio controlled model, the output arm 37 being pressed on the output shaft 35 over the splined portion 36, or otherwise suitably mounted according to known techniques. The motor 32 drives the output arm 36 in the direction of an arrow 39 in FIG. 4 and this drives the control linkage 38 in the direction of an arrow 40.

The output component 34 includes an output gear 41 that is coupled to the output shaft 35 by a slip clutch arrangement 42 that serves as means between the gear train 33 and the output shaft 35 for at least partially inhibiting the transmission of a transient force from the output shaft 35 back to the gear train 33. A shaft 43 of a position sensor or potentiometer 44 (FIG. 5) is also coupled to the output shaft 35, and it combines with electronic feedback control circuitry 45 to serve as position sensing means coupled to the output shaft 35 for producing a signal indicative of output shaft position for feedback control purposes. The feedback control circuitry 45 operates conventionally to sense the position of the output shaft 35 and drive the motor 32 until the output shaft 35 is in a desired position as indicated by the potentiometer 44.

Like the prior art, the above arrangement results in accurate control of the output shaft 35 according to well known principles of feedback control. But unlike the prior art, the slip clutch arrangement 42 at least partially decouples from the gear train 33 the transient forces coupled from the control linkage 38 back to the output shaft 35 that might otherwise cause damage. And, this is done inside the feedback loop so that accurate control of output shaft position is unimpaired.

Figure 6:
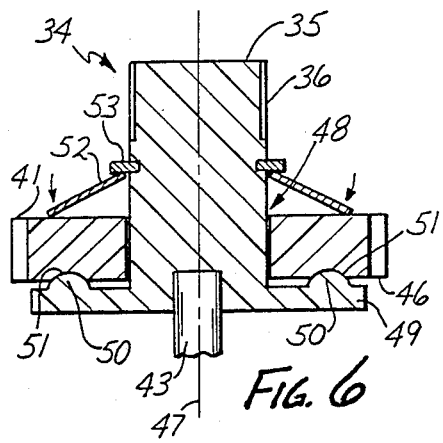
FIG. 6 is an enlarged cross sectional view of the slip clutch arrangement showing coupling of the output gear to the output shaft.
Figure 7:
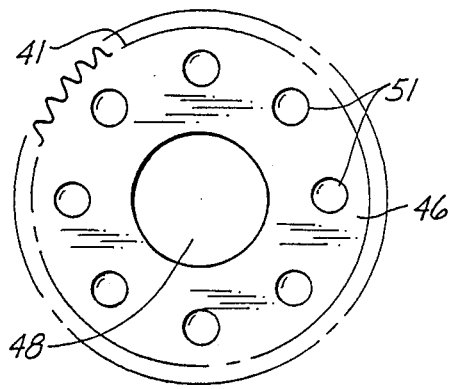
FIG. 7 is a bottom view of the output gear.

Further details of the output component 34 are shown in FIGS. 6 and 7. The output gear 41 has a transverse surface 46 generally perpendicular to an axis of rotation 47 of the output gear 41. The output gear 41 defines a central opening 48 that extends along the axis of rotation 47 through the output gear, and the output shaft 35 includes a radially extending portion 49 that faces the transverse surface 46 of the output gear 41.

The output shaft 35 extends along the axis of rotation 47 through the central opening 48 so that the output shaft 35 can rotate about the axis of rotation 47 relative to the output gear 41 and so that the output shaft 35 can be moved axially relative to the output gear 41 for purposes of forcing the radially extending portion 49 against the transverse surface 46. The radially extending portion 49 of the output shaft 41 includes means for engaging the output gear 41 when the radially extending portion 49 is forced against the transverse surface 46 of the output gear, and this is accomplished with protrusions 50 that seat in indentations 51.

A spring member in the form of a ring 52 operationally connected between the output gear 41 and a retainer clip 53 that is mounted by suitable means on the output shaft 35 (such as by seating in an annular groove in the output shaft 35) combine to serve as means for forcing the radially extending portion 49 of the output shaft 35 against the transverse surface 46 of the output gear 41 with a fixed amount of force so that the output shaft 35 slips relative to the output gear 41 when the transient force reaches the predetermined level. This may be done so that slippage occurs when the torque exceeds thirty inch-ounces, for example.

Thus, these components provide slip clutch means between the gear train 33 and the output shaft 35 for at least partially inhibiting the transmission of a transient force from the output shaft 35 back to the gear train 33. The protrusions 50 and indentations 51 serve as means for coupling the output gear 41 to the output shaft 35 to enable the output shaft 35 to slip relative to the output gear when the transient force reaches a predetermined level.

In other words, the protrusions 50 serve as means for engaging the output gear 41 when the radially extending portion 49 is forced against the transverse surface 46 of the output gear 41. When a transient force of sufficient size is coupled back to the output shaft 35, the protrusions 50 cam out of the indentations 51 with the output shaft moving axially a small amount relative to the output gear 41 as this happens. Then, the output shaft 35 rotates relative to the output gear 41 so that the protrusions 50 advance to the next indentations 51 without turning the output gear 41. This override or slippage occurs until the transient force subsides sufficiently.

Figure 8:
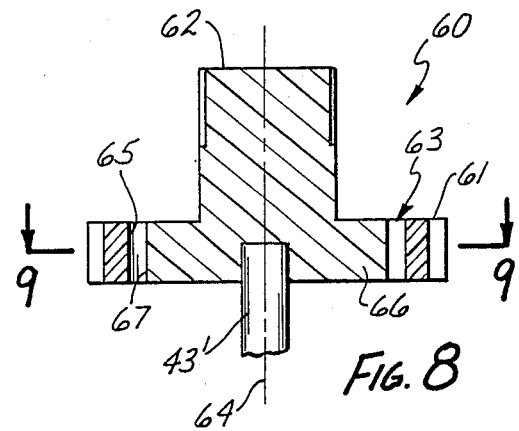
FIG. 8 is an enlarged cross sectional view of a second embodiment of a slip clutch arrangement.
Figure 9:
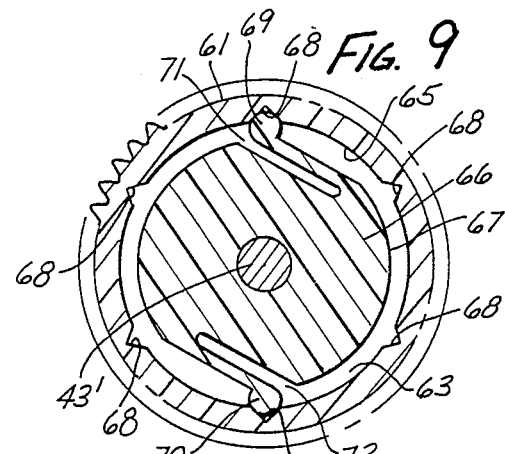
FIG. 9 is a cross sectional view taken on line 9—9 of FIG. 8.

Of course, other slip clutch arrangements may be used within the broader inventive concepts disclosed. Frictional engagement of the surface 46 by the radially extending portion 49 can be employed, for example. In addition, a concentric configuration can be employed as provided in an output component 60 shown in FIGS. 8 and 9. Furthermore, based upon the foregoing and subsequent discussions herein, it is evident to one skilled in the art that in the broader sense the slip clutch arrangement provides slippage between two rotatable hubs whether or not either one or both of those hubs is configured as or includes any features of an output shaft or gear or other component. Thus, the output shaft 35 is but one example of a first hub and the output gear 41 is but one example of a second hub, and it is intended that the claims not be limited to just shafts and gears. Instead, it is intended that any such hubs fall within the scope of the claims.

In the output component 60, the means for coupling an output gear 61 to an output shaft 62 includes the output gear 61 defining a central opening 63 that extends through the output gear 61 along an axis of rotation 64 of the output gear 61. The output gear 61 has an inwardly facing portion 65 facing the central opening 63. The output shaft 62 extends along the axis of rotation 64 through the central opening 63 so that the output shaft 62 can rotate about the axis of rotation 64 relative to the output gear 61. A potentiometer shaft 43' is connected to the output shaft 62 for position sensing purposes.

The output component 60 includes means for coupling the output shaft 62 to the inwardly facing portion 65 of the output gear 61 while enabling the output shaft 62 to slip relative to the output gear 61 when the transient force reaches the predetermined level. This is accomplished in the output component 60 by the output shaft 62 including a radially extending portion 66 disposed within the central opening 63. The radially extending portion 66 has a periphery 67 that faces the inwardly facing portion 65 of the output gear 61, and the means for coupling is arranged to couple the periphery 67 of the radially extending portion 66 of the output shaft 62 to the inwardly facing portion 65 of the output gear 61.

In the output component 60, the means for coupling the periphery includes a plurality of indentations 68 in the inwardly facing portion 65 of the output gear 61. First and second protruding portions 69 and 70 of the radially extending portion 66 of the output shaft 62 extend radially outwardly from the periphery 67 of the radially extending portion 66 of the output shaft 62 toward the inwardly facing portion 65 of the output gear 61 sufficiently that they can seat in the indentations 68 and engage the inwardly facing portion 65.

The radially extending portion 66 defines first and second slots 71 and 72 adjacent respective ones of the first and second protruding portions 69 and 70 that enable the protruding portions 69 and 70 to resiliently deform sufficiently to spring out of the indentations so that the output shaft 62 can slip relative to the output gear 61 when the transient force reaches the predetermined level. These may be injection molded thermoplastic components, for example.

When a transient force of sufficient magnitude is coupled to the output shaft 62, the protrusions 69 and 70 flex radially and advance to the next indentations 68 as the output shaft 62 rotates relative to the output gear 61.

Figure 10:
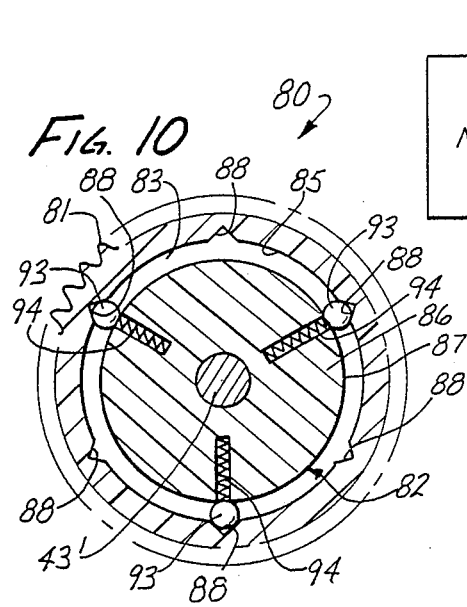
FIG. 10 is a cross sectional view showing a third embodiment of a slip clutch arrangement.

Preferably, the arrangement shown in FIG. 10 for an output component 80 is employed. For convenience, many features of the output component 80 that are similar to corresponding features of the output component 60 are designated with reference numerals increased by twenty over those for the output component 60. Instead of protrusions 69 and 70, the output component 80 employs ball bearings 93 that are spring biased radially toward the inwardly facing portion 85 by springs 94.

In other words, the means for coupling the periphery includes a plurality of indentations 88 in the inwardly facing portion 85, a plurality of ball bearings connected to the periphery 87 of the radially extending portion 66 in positions disposed between the periphery 87 and the inwardly facing portion 85, and means for urging the ball bearings 93 radially outwardly so that they can seat in the indentations 88 and thereby couple the periphery 87 of the radially extending portion 86 to the inwardly facing portion 85 and yet enable the output shaft 82 to slip relative to the output gear 81 when the transient force reaches the predetermined level.

Figure 11:
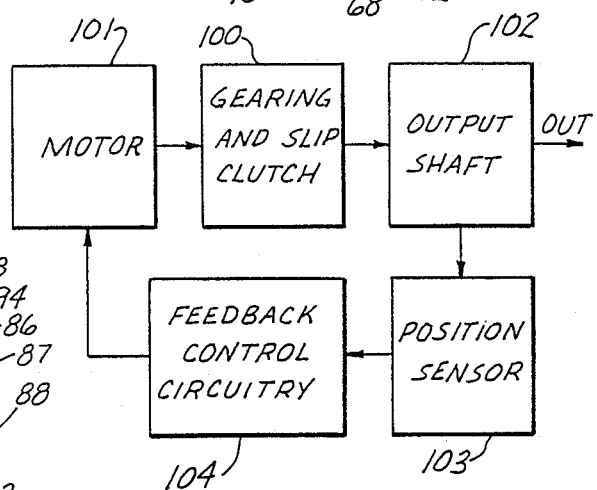
FIG. 11 is a block diagram of the RC servo illustrating the feedback control aspects.

Thus, this invention solves prior art problems with a RC servo that includes a feedback arrangement as shown in FIG. 11. It includes gearing and a slip clutch 100 between a motor 101 and an output shaft 102 to which a position sensor 103 is coupled for use with feedback control circuitry 104.

Thus, a servo protecting component is provided within the feed back loop that provides an override capability in order to decouple transient forces so that the output shaft can be rigidly coupled to the control linkage without the extra componentry and disadvantages that a spring-coupled entails. Because the slip clutch is within the feedback loop, the feedback control circuitry compensates for any sloppiness or play that the slip clutch introduces, and there is no limit to the override capability.

Although an exemplary embodiment of the invention has been shown and described, many changes, modifications, and substitutions may be made by one having ordinary skill in the art without necessarily departing from the spirit and scope of the invention.

What is claimed is:

1. A servo for driving a control linkage, comprising:
a motor;
a gear train coupled to the motor;
an output shaft coupled to the gear train to which to couple a control linkage;
position sensing means coupled to the output shaft for producing a signal indicative of output shaft position for feedback control purposes; and
slip clutch means within the gear train, between the motor and the output shaft, for at least partially inhibiting the transmission of a transient force through the gear train between the output shaft and the motor by enabling the output shaft to slip relative to the motor when the transient force reaches a predetermined level;
the slip clutch means including at least first and second hubs, each one of which first and second hubs is coupled to a respective one of the output shaft and the motor;
the first hub having a transverse surface generally perpendicular to an axis of rotation of the first hub;
the first hub defining a central opening that extends along the axis of rotation through the first hub;
the second hub including a radially extending portion that faces the transverse surface of the first hub;
the second hub extending along the axis of rotation through the central opening so that the second hub can rotate about the axis of rotation relative to the first hub and so that the second hub can be moved axially for purposes of forcing the radially extending portion against the transverse surface; and
the radially extending portion of the second hub having means for engaging the first hub when the radially extending portion is forced against the transverse surface of the first hub.

2. A servo as recited in claim 1, further comprising:
means for forcing the radially extending portion of the second hub against the transverse surface of the first hub so that the second hub slips relative to the first hub when the transient force reaches the predetermined level.

3. A servo for driving a control linkage, comprising:
a motor;
a gear train coupled to the motor;
an output shaft coupled to the gear train to which to couple a control linkage;
position sensing means coupled to the output shaft for producing a signal indicative of output shaft position for feedback control purposes; and
slip clutch means between the gear train and the output shaft for at least partially inhibiting the transmission of a transient force from the output shaft back to the gear train;
wherein the gear train includes an output gear and the slip clutch means includes means for coupling the output gear to the output shaft to enable the output shaft to slip relative to the output gear when the transient force reaches a predetermined level; and
wherein the means for coupling the output gear to the output shaft includes:
the output gear having a transverse surface generally perpendicular to an axis of rotation of the output gear;
the output gear defining a central opening that extends along the axis of rotation through the output gear;
the output shaft including a radially extending portion that faces the transverse surface of the output gear;
the output shaft extending along the axis of rotation through the central opening so that the output shaft can rotate about the axis of rotation relative to the output gear and so that the output shaft can be moved axially for purposes of forcing the radially extending portion against the transverse surface; and the radially extending portion of the output shaft having means for engaging the output gear when the radially extending portion is forced against the transverse surface of the output gear.

4. A servo as recited in claim 3, further comprising: means for forcing the radially extending portion of the output shaft against the transverse surface of the output gear so that the output shaft slips relative to the output gear when the transient force reaches the predetermined level.

5. A servo as recited in claim 4, wherein the means for forcing includes:
a spring member operationally connected between the output shaft and the output gear.

6. A servo as recited in claim 3, wherein the position sensing means includes:
a potentiometer connected to the output shaft.

7. A servo for driving a control linkage, comprising:
a motor;
a gear train coupled to the motor;
an output shaft coupled to the gear train to which to couple a control linkage;
position sensing means coupled to the output shaft for producing a signal indicative of output shaft position for feedback control purposes; and
slip clutch means between the gear train and the output shaft for at least partially inhibiting the transmission of a transient force from the output shaft back to the gear train;
wherein the gear train includes an output gear and the slip clutch means includes means for coupling the output gear to the output shaft to enable the output shaft to slip relative to the output gear when the transient force reaches a predetermined level; and
wherein the means for coupling the output gear to the output shaft includes:
the output gear defining a central opening that extends through the output gear along an axis of rotation of the output gear;
the output gear having an inwardly facing portion facing the central opening;
the output shaft extending along the axis of rotation through the central opening so that the output shaft can rotate about the axis of rotation relative to the output gear; and
means for coupling the output shaft to the inwardly facing portion of the output gear while enabling the output shaft to slip relative to the output gear when the transient force reaches the predetermined level.

8. A servo as recited in claim 7, wherein:
the output shaft includes a radially extending portion disposed within the central opening;
the radially extending portion has a periphery that faces the inwardly facing portion of the output gear; and
the means for coupling is arranged to couple the periphery of the radially extending portion of the output shaft to the inwardly facing portion of the output gear.

9. A servo as recited in claim 8, wherein the means for coupling the periphery includes:
a plurality of indentations in the inwardly facing portion of the output gear;
first and second protruding portions of the radially extending portion of the output shaft;
which first and second protruding portions extend radially outwardly from the periphery of the radially extending portion of the output shaft toward the inwardly facing portion of the output gear sufficiently that they can seat in the indentations and engage the inwardly facing portion of the output gear; and
the radially extending portion of the output shaft defining first and second slots adjacent respective ones of the first and second protruding portions that enable the protruding portions to resiliently deform sufficiently to spring out of the indentations so that the output shaft can slip relative to the output gear when the transient force reaches the predetermined level.

10. A servo as recited in claim 8, wherein the means for coupling the periphery includes:
a plurality of indentations in the inwardly facing portion of the output gear;
a plurality of ball bearings connected to the periphery of the radially extending portion of the output shaft in positions disposed between the periphery and the inwardly facing portion of the output gear; and
means for urging the ball bearings radially outwardly so that they can seat in the indentations and thereby couple the periphery of the radially extending portion of the output shaft to the inwardly facing portion of the output gear and yet enable the output shaft to slip relative to the output gear when the transient force reaches the predetermined level.

11. A servo as recited in claim 7, wherein the position sensing means includes:
a potentiometer connected to the output shaft.

12. A servo for driving a control linkage in a radio controlled model, comprising:
an electric motor;
a gear train coupled to the motor;
an output shaft coupled to the gear train to which to couple a control linkage of a radio controlled model;
position sensing means coupled to the output shaft for producing a signal indicative of output shaft position for feedback control purposes; and
slip clutch means between the gear train and the output shaft for at least partially inhibiting the transmission of a transient force from the output shaft back to the gear train;
wherein the slip clutch means includes an output component that includes the output shaft, an output gear, and means for coupling the output shaft to the output gear;
the output gear defining a central opening that extends through the output gear along an axis of rotation of the output gear and the output gear having an inwardly facing portion facing the central opening;
the output shaft extending along the axis of rotation through the central opening so that the output shaft can rotate about the axis of rotation relative to the output gear; and
the coupling means being arranged to couple the output shaft to the inwardly facing portion of the output gear while enabling the output shaft to slip relative to the output gear when the transient force reaches the predetermined level.

13. A servo as recited in claim 12, wherein:
the output shaft includes a radially extending portion disposed within the central opening;

the radially extending portion has a periphery that faces the inwardly facing portion of the output gear; and the means for coupling is arranged to couple the periphery of the radially extending portion of the output shaft to the inwardly facing portion of the output gear.

14. A servo as recited in claim 13, wherein the means for coupling the periphery includes:

a plurality of indentations in the inwardly facing portion of the output gear;

first and second ball bearings connected to the periphery of the radially extending portion of the output shaft in positions disposed between the periphery and the inwardly facing portion of the output gear; and means for urging the ball bearings radially outwardly so that they can seat in the indentations and thereby couple the periphery of the radially extending portion of the output shaft to the inwardly facing portion of the output gear and yet enable the output shaft to slip relative to the output gear when the transient force reaches the predetermined level.

15. A servo for driving a control linkage, comprising:

a motor;

an output shaft to which to couple a control linkage;

position sensing means coupled to the output shaft for producing a signal indicative of shaft position for feedback control purposes; and slip clutch means for coupling the motor to the output shaft while at least partially inhibiting the transmission of a transient force between the output shaft and the motor by enabling the output shaft to slip relative to the motor when the transient force reaches a predetermined level;

the slip clutch means including at least first and second hubs, each one of which first and second hubs is coupled to a respective one of the output shaft and the motor;

the first hub having a transverse surface generally perpendicular to an axis of rotation of the first hub;

the first hub defining a central opening that extends along the axis of rotation through the first hub;

the second hub including a radially extending portion that faces the transverse surface of the first hub;

the second hub extending along the axis of rotation through the central opening so that the second hub can rotate about the axis of rotation relative to the first hub and so that the second hub can be moved axially for purposes of forcing the radially extending portion against the transverse surface; and the radially extending portion of the second hub having means for engaging the first hub when the radially extending portion is forced against the transverse surface of the first hub.

16. A servo for driving a control linkage, comprising:

a motor;

an output shaft to which to couple a control linkage;

position sensing means coupled to the output shaft for producing a signal indicative of shaft position for feedback control purposes; and slip clutch means for coupling the motor to the output shaft while at least partially inhibiting the transmission of a transient force between the output shaft and the motor by enabling the output shaft to slip relative to the motor when the transient force reaches a predetermined level;

the slip clutch means including at least first and second hubs, each one of which first and second hubs is coupled to a respective one of the output shaft and the motor;

the first hub defining a central opening that extends through the first hub along an axis of rotation of the first hub;

the first hub having an inwardly facing portion facing the central opening;

the second hub extending along the axis of rotation through the central opening so that the second hub can rotate about the axis of rotation relative to the first hub; and means for coupling the second hub to the inwardly facing portion of the first hub while enabling the second hub to slip relative to the first hub when the transient force reaches the predetermined level.

* * * * *